United States Patent
Ma

(10) Patent No.: US 6,407,842 B1
(45) Date of Patent: Jun. 18, 2002

(54) METHOD AND APPARATUS FOR TRANSMITTING A WDM OPTICAL SIGNAL HAVING NONUNIFORM CHANNEL SPACINGS

(75) Inventor: Xiaobing Ma, Morganville, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/181,194

(22) Filed: Oct. 28, 1998

(51) Int. Cl.$^7$ ................................................. H04B 10/12
(52) U.S. Cl. ...................... 359/173; 359/124; 359/133; 359/156; 359/158; 359/183
(58) Field of Search ................................. 359/124–134, 359/173, 181, 183, 156, 158

(56) References Cited

U.S. PATENT DOCUMENTS

| | | | | |
|---|---|---|---|---|
| 5,390,043 A | * | 2/1995 | O'Byrne | 359/191 |
| 5,526,162 A | * | 6/1996 | Bergano | 359/181 |
| 5,611,005 A | * | 3/1997 | Heismann et al. | 385/11 |
| 5,801,862 A | * | 9/1998 | Desurvire | 359/124 |
| 5,946,119 A | * | 8/1999 | Bergano et al. | 359/124 |
| 6,081,355 A | * | 6/2000 | Sharma et al. | 359/110 |
| 6,097,525 A | * | 8/2000 | Ono et al. | 359/181 |

* cited by examiner

Primary Examiner—Leslie Pascal
Assistant Examiner—Chau M. Nguyen

(57) ABSTRACT

A method and apparatus is provided for transmitting an optical signal through an optical fiber. The apparatus includes an optical signal source, which generates an optical signal having a plurality of optical channels onto which data is modulated. Each of the optical channels is defined by a different carrier wavelength. A phase modulator imparts phase modulation to the plurality of optical channels so that channels nearest a zero dispersion wavelength of the optical fiber are more closely spaced to one another than channels farthest in wavelength from the zero dispersion wavelength of the optical fiber.

19 Claims, 3 Drawing Sheets

METHOD AND APPARATUS FOR TRANSMITTING A WDM OPTICAL SIGNAL HAVING NONUNIFORM CHANNEL SPACINGS

FIELD OF THE INVENTION

The invention relates generally to optical transmission systems, and more particularly to a transmitter for transmitting wavelength division multiplexed optical signals through an optical communication system.

BACKGROUND OF THE INVENTION

Signals on optical fiber transmission lines characterized by large bit rate distance products, such as undersea or transcontinental terrestrial lightwave transmission systems and which employ optical amplifiers are subject to a host of impairments that accumulate along its length. The source of these impairments within a single data channel include amplified spontaneous emission (ASE) noise generated in the erbium-doped fiber amplifiers (EDFAs), polarization dependent gain caused by hole burning in the EDFAs, polarization dependent loss (PDL) in the passive components, nonlinear effects resulting from the dependence of the refractive index of single-mode fiber on the intensity of the light propagating therethrough, and chromatic dispersion which causes different optical frequencies to travel at different group velocities. In addition, for wavelength division multiplexed (WDM) systems in which a plurality of optical channels are transmitted on the same optical fiber, crosstalk between channels caused by the fiber's nonlinear index and incomplete channel selection at the receiving terminal must be considered.

WDM systems often employ transmitters that impart phase modulation to the carrier wavelengths. The phase modulation increases the spectral width of each channel so that its peak intensity is reduced, thus reducing the adverse effects of nonlinear interactions. Such transmitters may also include a polarization scrambler for varying the polarization states of the carrier wavelengths. As discussed in more detail in U.S. Pat. No. 5,526,162, for example, polarization scrambling is advantageous because it minimizes the effects of polarization hole burning. Polarization scrambling is accomplished by splitting the signal into two equal orthogonal components, applying phase modulation to one of the components and then recombining the components.

Unfortunately, the phase modulation imparted to the carrier wavelengths to reduce nonlinear interactions and polarization hole burning limits the number of channels that fit within a given bandwidth because phase modulation increases the spectral width of each channel. Of course, to increase transmission capacity, it is desirable to use as many channels as possible over the limited bandwidth that is available, thus requiring that the spectral width of the individual channels be kept to a minimum.

Accordingly, it would be desirable to impart sufficient phase modulation to the optical carrier wavelengths in a WDM transmission system to substantially reduce nonlinear interactions and polarization hole burning while avoiding any excess phase modulation so that the spacing between individual channels is reduced to increase system capacity.

SUMMARY OF THE INVENTION

In accordance with the present invention, an apparatus is provided for transmitting an optical signal through an optical fiber. The apparatus includes an optical signal source, which generates an optical signal having a plurality of optical channels onto which data is modulated. Each of the optical channels is defined by a different carrier wavelength. A phase modulator imparts phase modulation to the plurality of optical channels so that channels nearest a zero dispersion wavelength of the optical fiber are more closely spaced to one another than channels farthest in wavelength from the zero dispersion wavelength of the optical fiber.

The optical channels closest to the zero dispersion wavelength exhibit relatively low nonlinearities and hence do not require as a great a reduction in intensity as channels more remote from the zero dispersion wavelength. That is, these channels require less spectral broadening by phase modulation to reduce their peak intensities. Since those optical channels closest to the zero dispersion wavelength require the least amount of phase modulation, the present invention advantageously reduces any excess phase modulation so that the individual channels may be more closely situated to one another, increasing transmission capacity within the operating bandwidth.

In accordance with another aspect of the invention a method is provided for transmitting an optical signal. In particular, an optical signal is generated which has a plurality of optical channels onto which data is modulated. Each of the optical channels is defined by a different carrier wavelength. Phase modulation is imparted to each of the plurality of optical channels based on its spectral distance from a zero dispersion wavelength of the optical fiber. In one particular embodiment of the invention, the phase modulation is arranged so that increasing phase modulation is imparted to optical channels increasingly remote in wavelength from the zero dispersion wavelength of the optical fiber.

DETAILED DESCRIPTION

Figure 1:
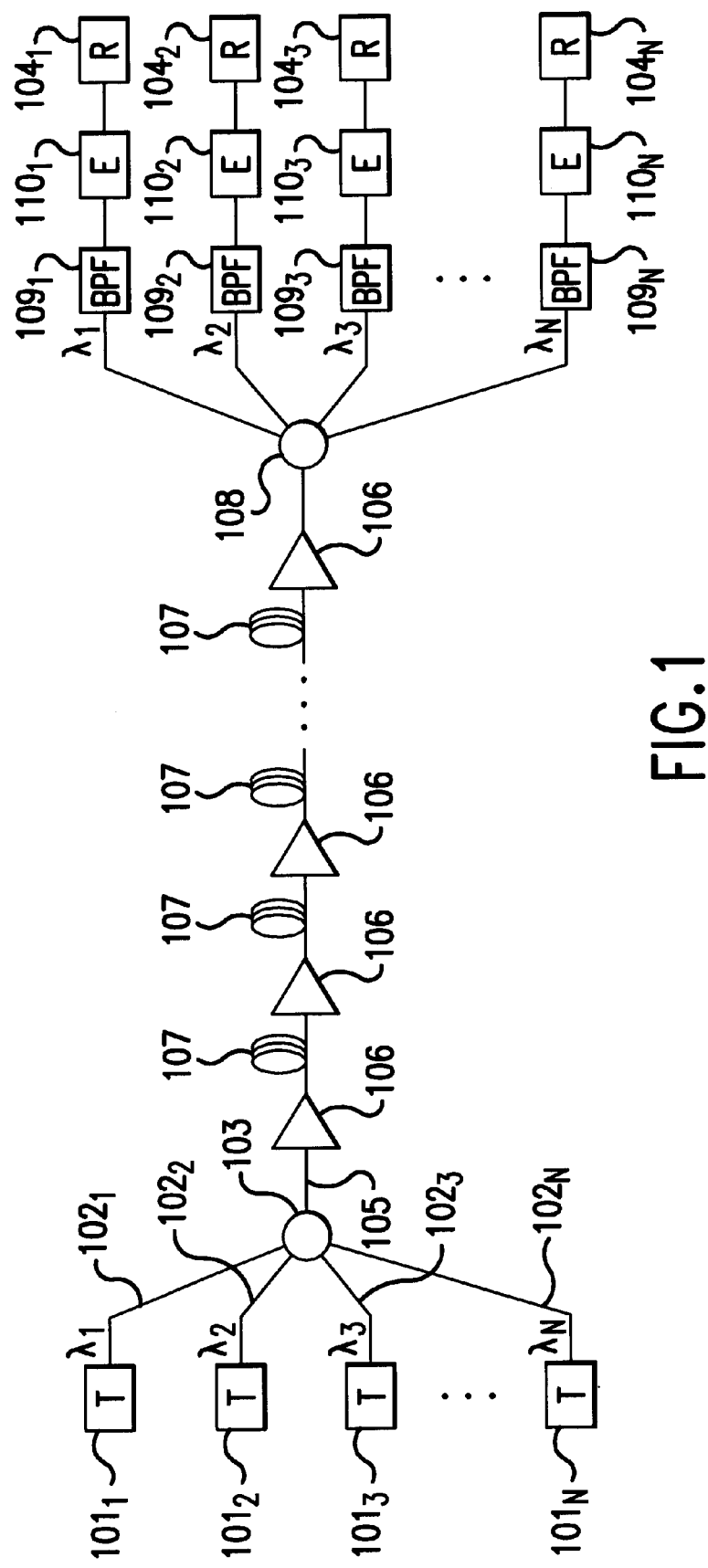
FIG. 1 shows a simplified block diagram of an exemplary wavelength division multiplexed (WDM) transmission system in accordance with the present invention.

FIG. 1 shows a simplified block diagram of an exemplary wavelength division multiplexed (WDM) transmission system in accordance with the present invention. The transmission system serves to transmit a plurality of optical channels over a single path from a transmitting terminal to a remotely located receiving terminal. Specifically, a plurality of transmitters $101_1, 101_2, \ldots 101_N$ transmit data signals on a set of wavelengths $\lambda_1, \lambda_2, \ldots \lambda_N$, which are respectively carried on a plurality of paths $102_1, 102_2, \ldots 102_N$. The data channels are combined onto a single path by a signal combiner 103. The functionality of the signal combiner can be performed by a variety of devices such as a wavelength independent directional coupler or a wavelength router of the type described in U.S. Pat. Nos. 5,002,350 and 5,412,744. The combined set of optical channels are transmitted to a plurality of remote receiving terminals 104 via optical transmission path 105, which could, for example, include erbium-doped fiber amplifiers 106 optically coupling individual spans of single-mode optical fibers 107. A 1×N splitter 108 and a plurality of optical bandpass filters 109 demultiplexes the optical channels at the remote or receiving end of the system. As those skilled in the art will appreciate, the functionality of splitter 108 and bandpass filters 109 may be achieved in a number of different ways. For example, the previously mentioned wavelength router that is employed as a multiplexer in the transmitter may also be used as a demultiplexer in the receiver.

Figure 2:
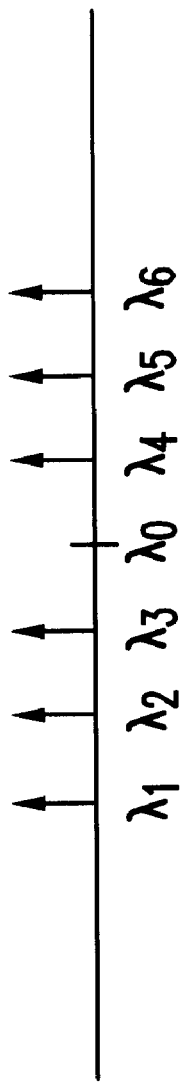
FIG. 2 shows the spectral locations of six WDM channels relative to the zero dispersion wavelength for a conventional WDM transmitter in which the channel spacing is uniform.

Because of the dispersion slope of optical fiber, only one wavelength or channel can be located at the zero dispersion wavelength of the transmission line. Typically, as shown in FIG. 2, the zero dispersion wavelength is located near the center of the usable bandwidth. For example, the six WDM channels shown in FIG. 2 are centered about the zero dispersion wavelength $\lambda_0$.

As previously mentioned, the plurality of transmitters $101_1, 101_2, \ldots, 101_N$ each typically includes a phase modulator and/or a polarization scrambler. In either case phase modulation is imparted to the optical signals. For example, the transmitters $101_1, 101_2, \ldots, 101_N$ may be so-called synchronously modulated transmitters in which phase and polarization modulation are imparted at the rate at which data is modulated onto the signals. An example of a synchronously modulated transmitter is disclosed in U.S. Appl. Ser. No. 08/771,097 filed on Dec. 20, 1996, now Ser. No. 09/776,942.

Figure 4:
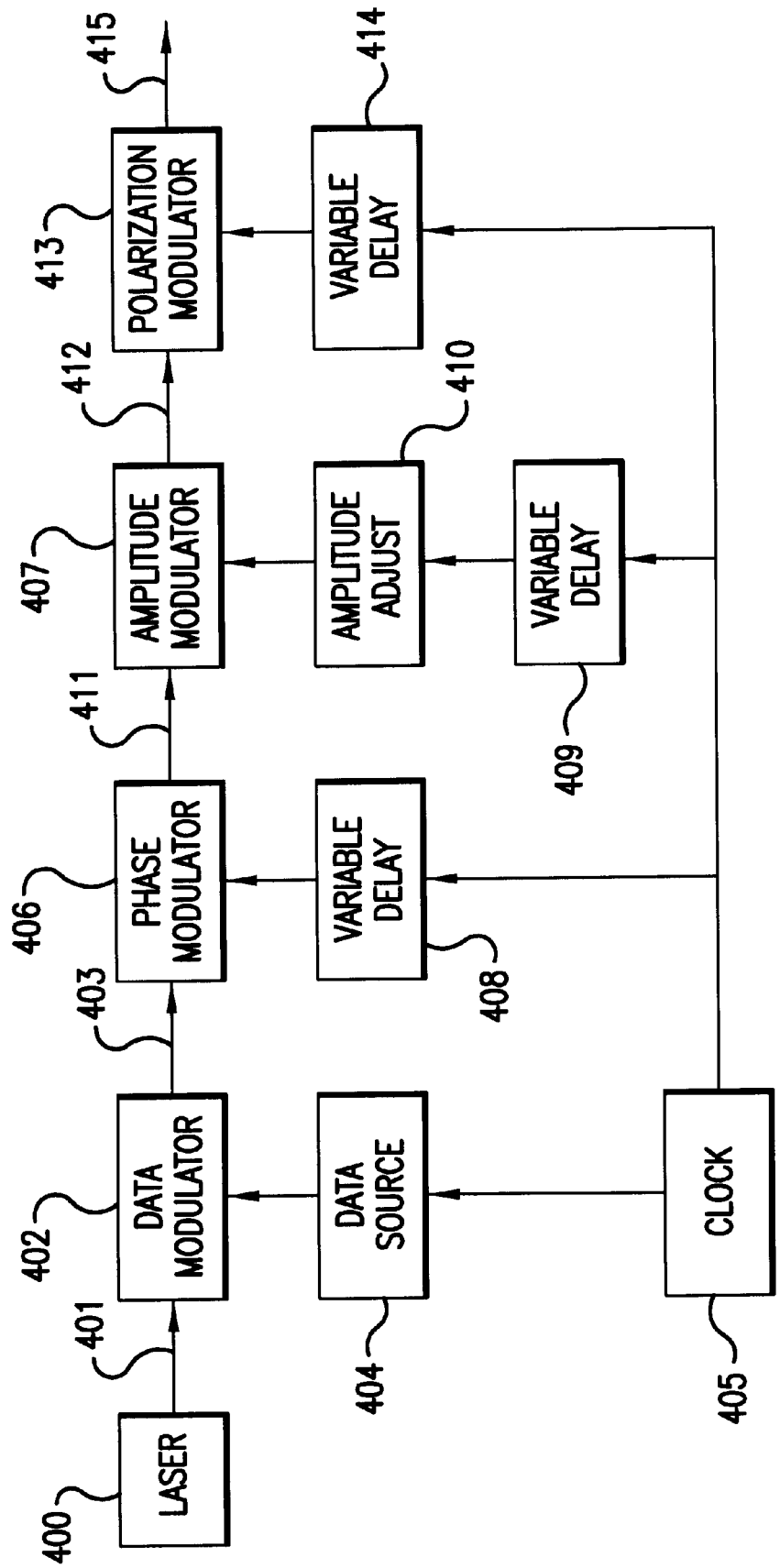

FIG. 4 shows transmitter $101_N$ employing synchronous polarization and optical phase modulation The transmitter disclosed in application Ser. No. 09/776,942 illustrates a laser 400 that produces a continuous wave (CW) optical signal 401. The optical signal 401 is transmitted to a data modulator 402 that modulates the signal to impart information thereto in a well known fashion, producing a modulated optical information signal 403. The data modulator 402 receives the data to be imparted to the optical signal 401 from a data source 404 and modulates the optical signal 401 at a frequency determined by a clock 405. The optical information signal 403 is transmitted from the data modulator 402 to optical phase modulator 406, amplitude modulator 407, and finally to polarization modulator 413. The clock 405 drives the three modulation stages via a series of variable delay elements 408, 409 and 414, which are used to selectively adjust the delay of the modulation imparted by modulators 406, 407 and 413 relative to the phase of the data modulation imparted by modulator 402. In accordance with the present invention, the amplitude modulator 407 is driven by the clock 405 so that the intensity of the optical information signal is re-modulated at a rate equal to the rate at which data is imparted to the optical signal 401. An amplitude adjustment mechanism 410 is employed to set the modulation depth that amplitude modulator 410 imparts on signal 413.

Prior to phase modulation (whether resulting from polarization scrambling or direct phase modulation), the optical channels in a typical long-haul transmission system have an inherent spectral width of approximately 20 GHz for a 10 Gb/s data rate, in comparison to a spectral width of about 60 Ghz after phase modulation for the same data rate, which substantially reduces the transmission capacity of the system.

The present inventor has realized that phase modulation does not have to be applied in equal amounts to all of the channels. Rather, the inventor has recognized that the channel at or nearest to the zero dispersion wavelength requires the least amount of phase modulation and the channel most remote from the zero dispersion wavelength requires the maximum amount of the phase modulation. In other words, the amount of phase modulation that is required depends on the channel's distance from the zero dispersion wavelength. Specifically, as the distance between the channel and the zero dispersion wavelength of the fiber increases, the required amount of phase modulation increases.

Minimal phase modulation is required for signals nearest the zero dispersion wavelength because at this wavelength nonlinearities are low. Accordingly, since the adverse effects of nonlinearities arise at high intensities, it is not necessary to reduce the channel intensity by spectral broadening (i.e., phase modulation) when nonlinearities are low. As nonlinearities increase for channels at increasing distance from the zero dispersion wavelength, correspondingly more phase modulation is required.

Figure 3:
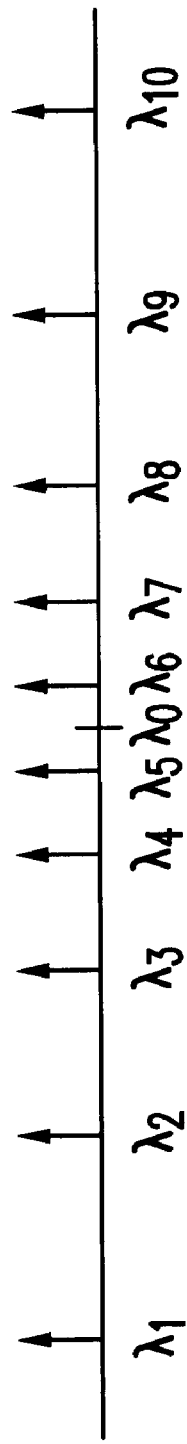
FIG. 3 shows spectral locations for ten WDM channels relative to the zero dispersion wavelength for a WDM transmitter constructed in accordance with the present invention.

In accordance with the present invention, a nonuniform distribution of phase modulation is employed across the operating bandwidth of a WDM transmission system. The centermost channels undergo the least amount of phase modulation and the outermost channels undergo the most amount of phase modulation. Accordingly, as shown in FIG. 3, the centermost channels (e.g., channels 5 and 6 in FIG. 3) may be relatively closely spaced to one another while the outermost channels (e.g., channels 1 and 2 and channels 9 and 10) require the most spectral separation between them. The present invention thus employs nonuniform channel spacing across the operating bandwidth, with the centermost channels being more closely spaced to one another than the outermost channels. In contrast, known WDM transmission systems employ either a constant channel spacing or a random or quasi-random distribution of channel spacings in an attempt to reduce four-wave mixing.

The present invention imparts no more phase modulation to a given channel than is required to reduce nonlinear interactions, allowing more channels to occupy a given bandwidth. A primary advantage of the present invention over known WDM transmission systems is therefore that the capacity of such systems can be increased, possibly by as much as 50% or more.

What is claimed is:

1. An apparatus for transmitting an optical signal through an optical fiber, comprising:

an optical signal source generating an optical signal having a plurality of optical channels onto which data is modulated, each of said optical channels being defined by different carrier wavelengths; and a phase modulator imparting phase modulation to the plurality of optical channels so that channels nearest a zero dispersion wavelength of the optical fiber are more closely spaced to one another than channels farthest in wavelength from the zero dispersion wavelength of the optical fiber.

2. The apparatus of claim 1 wherein said phase modulator is a part of a polarization modulator.

3. The apparatus of claim 2 wherein said polarization modulator is a synchronous polarization modulator that modulates polarization at a rate at which data is modulated onto the optical signals.

4. The apparatus of claim 2 wherein said polarization modulator is a polarization scrambler.

5. An apparatus for transmitting an optical signal through an optical fiber, comprising:

an optical signal source generating an optical signal having a plurality of optical channels onto which data is modulated, each of said optical channels being defined by different carrier wavelengths; and a phase modulator imparting phase modulation to each of the plurality of optical channels based on its spectral distance from a zero dispersion wavelength of the optical fiber.

6. The apparatus of claim 5 wherein said phase modulator imparts increasing phase modulation to optical channels increasingly remote in wavelength from the zero dispersion wavelength of the optical fiber.

7. The apparatus of claim 5 wherein said phase modulator is a part of a polarization modulator.

8. The apparatus of claim 7 wherein said polarization modulator is a synchronous polarization modulator that modulates polarization at a rate at which data is modulated onto the optical signals.

9. The apparatus of claim 7 wherein said polarization modulator is a polarization scrambler.

10. A method for transmitting an optical signal comprising the steps of:

generating an optical signal having a plurality of optical channels onto which data is modulated, each of said optical channels being defined by different carrier wavelengths; and imparting phase modulation to each of the plurality of optical channels based on its spectral distance from a zero dispersion wavelength of the optical fiber.

11. The method of claim 10 wherein the step of imparting phase modulation comprises the step of imparting increasing phase modulation to optical channels increasingly remote in wavelength from the zero dispersion wavelength of the optical fiber.

12. The method of claim 10 wherein the step of imparting phase modulation includes the step of imparting polarization modulation to each of the plurality of optical channels.

13. The method of claim 12 wherein the step of imparting polarization modulation is performed synchronously with a rate at which data is modulated onto the optical signals.

14. The method of claim 12 wherein the step of imparting polarization modulation includes the step of imparting polarization scrambling.

15. A WDM transmission system comprising:

a transmitter, including an optical signal source generating an optical signal having a plurality of optical channels onto which data is modulated, each of said optical channels being defined by different carrier wavelengths; and a phase modulator imparting phase modulation to each of the plurality of optical channels based on its spectral distance from a zero dispersion wavelength of the optical fiber;

an optical transmission path coupled to said transmitter; and a receiver coupled to the optical transmission path.

16. The transmission system of claim 15 wherein said phase modulator imparts increasing phase modulation to optical channels increasingly remote in wavelength from the zero dispersion wavelength of the optical fiber.

17. The transmission system of claim 16 wherein said phase modulator is a part of a polarization modulator.

18. The transmission system of claim 17 wherein said polarization modulator is a synchronous polarization modulator that modulates polarization at a rate at which data is modulated onto the optical signals.

19. The transmission system of claim 17 wherein said polarization modulator is a polarization scrambler.

* * * * *